United States Patent
Kumar

(10) Patent No.: US 10,623,819 B2
(45) Date of Patent: *Apr. 14, 2020

(54) ACCESSING LAST-BROWSED INFORMATION IN A MEDIA PLAYBACK SYSTEM

(71) Applicant: Sonos, Inc., Santa Barbara, CA (US)

(72) Inventor: Abhishek Kumar, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,571

(22) Filed: Jul. 16, 2018

(65) Prior Publication Data
US 2018/0359531 A1    Dec. 13, 2018

Related U.S. Application Data

(63) Continuation of application No. 14/042,174, filed on Sep. 30, 2013, now Pat. No. 10,028,028.

(51) Int. Cl.
*G06F 3/0482* (2013.01)
*H04N 21/4725* (2011.01)
(Continued)

(52) U.S. Cl.
CPC ... *H04N 21/4725* (2013.01); *H04N 21/44222* (2013.01); *H04N 21/8113* (2013.01);
(Continued)

(58) Field of Classification Search
CPC .......... H04N 21/4725; H04N 21/8113; H04N 21/44222; H04N 5/4403; G06F 16/44; G06F 3/0482
See application file for complete search history.

(56) References Cited

U.S. PATENT DOCUMENTS

| 4,336,449 A | 6/1982 | Perry |
| 5,406,634 A | 4/1995 | Anderson et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Advisory Action dated Mar. 17, 2016, issued in connection with U.S. Appl. No. 14/042,174, filed Sep. 30, 2013, 4 pages.
(Continued)

*Primary Examiner* — Nicholas Klicos
(74) *Attorney, Agent, or Firm* — McDonnell Boehnen Hulbert & Berghoff LLP

(57) ABSTRACT

Embodiments are discussed for providing an indication of information previously accessed, or "browsed," by a user on a control device of a media playback system, irrespective of a prior graphical display on the control device. The embodiments may involve causing a graphical display to provide a visual indication of a selectable region, receiving selection data that indicates a selection of the selectable region, irrespective of a prior graphical display and in response to receiving the selection data, identifying browse data that was most-recently accessed by the control device, where the browse data includes an indication of one or more playable media items, and causing the graphical display to provide a visual indication of the one or more playable media items indicated by the identified browse data.

20 Claims, 12 Drawing Sheets

(51) Int. Cl.
*H04N 21/442* (2011.01)
*H04N 21/81* (2011.01)
H04N 5/44 (2011.01)
G06F 16/44 (2019.01)

(52) U.S. Cl.
CPC ............ *G06F 3/0482* (2013.01); *G06F 16/44* (2019.01); *H04N 5/4403* (2013.01)

(56) References Cited

U.S. PATENT DOCUMENTS

| | | |
|---|---|---|
| 5,440,644 A | 8/1995 | Farinelli et al. |
| 5,598,278 A | 1/1997 | Tanaka et al. |
| 5,761,320 A | 6/1998 | Farinelli et al. |
| 5,856,827 A | 1/1999 | Sudo |
| 5,859,638 A | 1/1999 | Coleman et al. |
| 5,923,902 A | 7/1999 | Inagaki |
| 6,002,862 A | 12/1999 | Takaike |
| 6,025,838 A | 2/2000 | Bardon et al. |
| 6,032,202 A | 2/2000 | Lea et al. |
| 6,181,316 B1 | 1/2001 | Little et al. |
| 6,185,737 B1 | 2/2001 | Northcutt et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,218 B2 | 9/2006 | Battles et al. |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,483,538 B2 | 1/2009 | McCarty et al. |
| 7,545,440 B2 | 6/2009 | Kim et al. |
| 7,560,637 B1 | 7/2009 | Robbin et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,788,582 B2 | 8/2010 | Robbin et al. |
| 7,805,682 B1 | 9/2010 | Lambourne et al. |
| 7,853,341 B2 | 12/2010 | McCarty et al. |
| 7,949,707 B2 | 5/2011 | McDowall et al. |
| 7,956,272 B2 | 6/2011 | Wysocki et al. |
| 7,987,294 B2 | 7/2011 | Bryce et al. |
| 8,014,423 B2 | 9/2011 | Thaler et al. |
| 8,017,852 B2 | 9/2011 | Yamashita et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,234,395 B2 | 7/2012 | Millington et al. |
| 8,276,076 B2 | 9/2012 | Torrens et al. |
| 8,290,603 B1 | 10/2012 | Lambourne et al. |
| 8,483,853 B1 | 7/2013 | Lambourne |
| 8,634,944 B2 | 1/2014 | Bull et al. |
| 8,683,378 B2 | 3/2014 | Bull et al. |
| 8,694,910 B2 | 4/2014 | Lambourne et al. |
| 8,766,079 B2 | 7/2014 | Utsuki et al. |
| 8,954,855 B2 | 2/2015 | Shirai et al. |
| 8,977,963 B1 | 3/2015 | Joyce et al. |
| 9,075,509 B2 | 7/2015 | Lambourne et al. |
| 9,141,645 B2 | 9/2015 | Lambourne et al. |
| 9,213,356 B2 | 12/2015 | Millington |
| 9,232,277 B2 | 1/2016 | Vega et al. |
| 9,247,363 B2 | 1/2016 | Triplett et al. |
| 9,501,533 B2 | 11/2016 | Coburn et al. |
| 9,510,055 B2 | 11/2016 | Kuper et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0089529 A1 | 7/2002 | Robbin |
| 2002/0124097 A1 | 9/2002 | Isely et al. |
| 2002/0163361 A1 | 11/2002 | Parkin |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0157951 A1 | 8/2003 | Hasty |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0113952 A1 | 6/2004 | Randall |
| 2004/0117631 A1 | 6/2004 | Colvin |
| 2004/0215611 A1 | 10/2004 | Jawa et al. |
| 2004/0233235 A1 | 11/2004 | Rubin et al. |
| 2004/0261040 A1 | 12/2004 | Radcliffe et al. |
| 2005/0097618 A1 | 5/2005 | Arling et al. |
| 2005/0108320 A1 | 5/2005 | Lord et al. |
| 2005/0114798 A1 | 5/2005 | Jiang et al. |
| 2005/0154988 A1 | 7/2005 | Proehl et al. |
| 2005/0166157 A1 | 7/2005 | Ollis et al. |
| 2006/0026535 A1 | 2/2006 | Hotelling et al. |
| 2006/0095848 A1 | 5/2006 | Naik |
| 2006/0107237 A1 | 5/2006 | Kim |
| 2006/0156239 A1 | 7/2006 | Jobs et al. |
| 2006/0168340 A1 | 7/2006 | Heller et al. |
| 2006/0195480 A1 | 8/2006 | Spiegelman et al. |
| 2006/0206493 A1* | 9/2006 | Lipscomb ............ G11B 27/034 |
| 2006/0253782 A1 | 11/2006 | Stark et al. |
| 2007/0038999 A1 | 2/2007 | Millington et al. |
| 2007/0079251 A1 | 4/2007 | Peterkofsky et al. |
| 2007/0083911 A1 | 4/2007 | Madden et al. |
| 2007/0142944 A1 | 6/2007 | Goldberg et al. |
| 2007/0288470 A1 | 12/2007 | Kauniskangas et al. |
| 2008/0005690 A1 | 1/2008 | Van Vugt |
| 2008/0016465 A1 | 1/2008 | Foxenland |
| 2008/0040687 A1 | 2/2008 | Randall |
| 2008/0163127 A1 | 7/2008 | Newell et al. |
| 2008/0200154 A1 | 8/2008 | Maharajh et al. |
| 2009/0177301 A1* | 7/2009 | Hayes ................. G11B 19/025 |
| | | 700/94 |
| 2009/0217336 A1 | 8/2009 | Chang et al. |
| 2009/0228919 A1 | 9/2009 | Zott et al. |
| 2010/0027966 A1 | 2/2010 | Harrang et al. |
| 2010/0064258 A1 | 3/2010 | Gorczowski et al. |
| 2010/0070925 A1 | 3/2010 | Einaudi et al. |
| 2010/0161575 A1 | 6/2010 | Basso et al. |
| 2010/0262938 A1 | 10/2010 | Woods et al. |
| 2010/0313133 A1 | 12/2010 | Green et al. |
| 2011/0091187 A1 | 4/2011 | Duffin et al. |
| 2011/0099519 A1 | 4/2011 | Ma et al. |
| 2011/0143653 A1 | 6/2011 | Lane et al. |
| 2011/0304627 A1 | 12/2011 | Kegel et al. |
| 2012/0117586 A1 | 5/2012 | McCoy et al. |
| 2012/0174039 A1* | 7/2012 | Rhoads .............. H04N 21/4312 |
| | | 715/854 |
| 2012/0210352 A1 | 8/2012 | Wong et al. |
| 2012/0210378 A1 | 8/2012 | McCoy et al. |
| 2013/0007499 A1 | 1/2013 | Moy |
| 2013/0047087 A1 | 2/2013 | Yamahara et al. |
| 2013/0051755 A1 | 2/2013 | Brown et al. |

(56) References Cited

U.S. PATENT DOCUMENTS

| | | | |
|---|---|---|---|
| 2013/0072108 A1* | 3/2013 | Spurgat | G11B 27/10 |
| | | | 455/3.06 |
| 2013/0198268 A1 | 8/2013 | Hyman | |
| 2013/0198632 A1 | 8/2013 | Hyman | |
| 2013/0219273 A1 | 8/2013 | Coburn | |
| 2013/0254207 A1 | 9/2013 | Coburn, IV et al. | |
| 2013/0332311 A1 | 12/2013 | Pu et al. | |
| 2013/0343567 A1 | 12/2013 | Triplett et al. | |
| 2014/0181199 A1 | 6/2014 | Kumar et al. | |
| 2014/0181654 A1 | 6/2014 | Kumar et al. | |
| 2014/0181655 A1 | 6/2014 | Kumar et al. | |
| 2015/0149901 A1 | 5/2015 | Otto et al. | |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Dec. 15, 2015, issued in connection with U.S. Appl. No. 14/042,174, filed Sep. 30. 2013, 24 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jul. 10, 2017, issued in connection with U.S. Appl. No. 14/042,174, filed Sep. 30, 2013, 38 pages.
Non-Final Office Action dated Dec. 13, 2016, issued in connection with U.S. Appl. No. 14/042,174, filed Sep. 30, 2016, 29 pages.
Notice of Allowance dated Mar. 1, 2018, issued in connection with U.S. Appl. No. 14/042,174, filed Sep. 30 2013, 8 pages.
Palm, Inc., "Handbook for the Palm VII Handheld," May 2000, 311 pages.
Presentations at WinHEC 2000, May 2000, 138 pages.
PRISMIQ, Inc., "PRISMIQ Media Player User Guide," 2003, 44 pages.
Sonos, Inc., "Sonos Controller 100 Product Guide", 2011, pp. 1-8.
Sonos, Inc., "Sonos ZonePlayer 100 Product Guide", 2011, pp. 1-17.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Whitson Gordon, "How to Make Google Music Your Secondary Media Player (and Why You Should)", Feb. 7, 2012, Lifehacker, accesed on Jul. 9, 2015, accessed from https://lifehacker.com/5882992/how-to-make-google-music-your-secondary-media-player-and-why-you-should.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ACCESSING LAST-BROWSED INFORMATION IN A MEDIA PLAYBACK SYSTEM

CROSS REFERENCE TO RELATED APPLICATIONS

This application claims priority under 35 U.S.C. § 120 to, and is a continuation of, U.S. non-provisional patent application Ser. No. 14/042,174, filed on Sep. 30, 2013, entitled "Accessing Last-Browsed Information in a Media Playback System," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to manage or play digital music, like digital music files or even Internet radio, in the home through the use of their computer or similar devices. Now there are many different ways to manage or play digital music, in addition to other digital content including digital video and photos, stimulated in many ways by high-speed Internet access at home, mobile broadband Internet access, and the consumer demand for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the growing consumer demand for digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
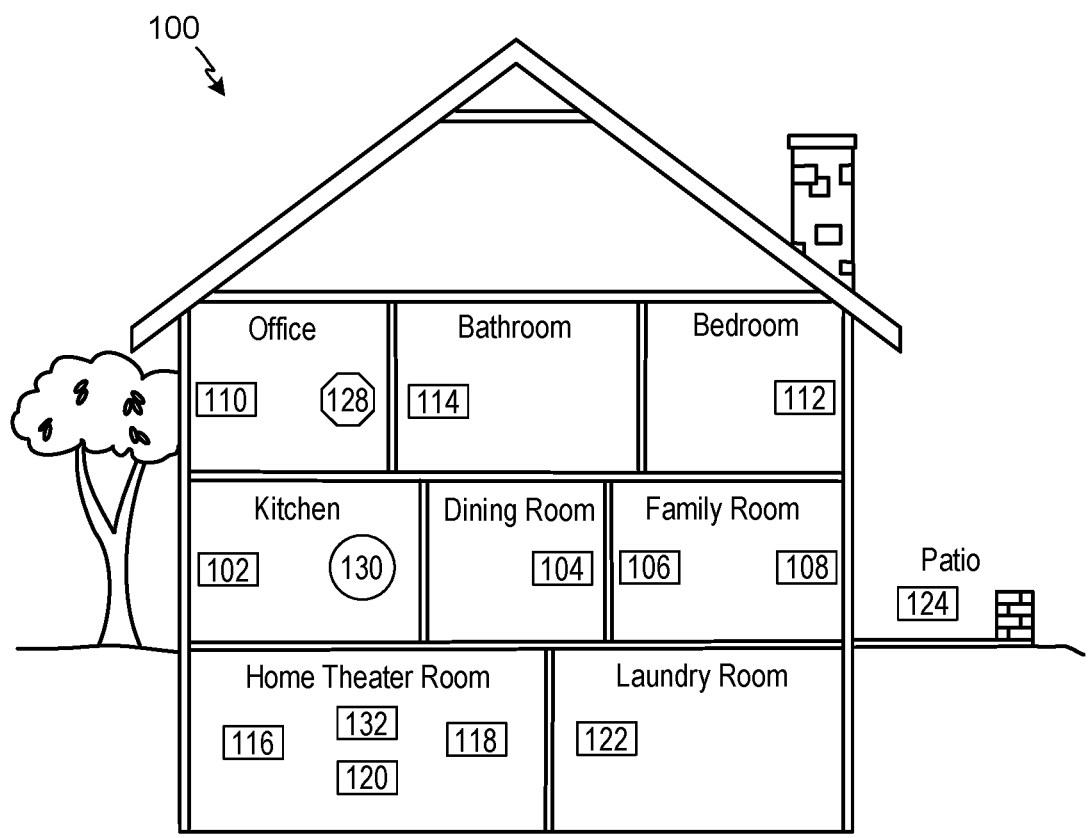
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve providing an indication of information previously accessed, or "browsed," by a user on a control device of a media playback system, irrespective of a prior graphical display that the user accessed on the control device. In an embodiment, the indication may correspond to information most-recently accessed, or "last browsed," by one or more network-connected control devices of a media playback system. The description contained herein is generally directed to most-recently accessed information pertaining to playable media items. However, this is for purposes of example and explanation only. It should be understood that the description contained herein may equally apply to other types of information as well.

For example, a control device (such as a control device configured to control one or more media playback devices in a media playback system) may initially cause a graphical display to provide a visual indication of a selectable region. The visual indication of the selectable region may be provided as part of an application for accessing the media playback system, or an application for accessing a music service that is also accessible by the media playback system. In some cases, while the graphical display provides the visual indication of the selectable region, the control device may also cause the graphical display to provide a visual indication of a playback status associated with the playback of a media item by a playback device in the media playback system.

The control device may then receive selection data that indicates a selection of the selectable region. Such a selection of the selectable region may indicate a user's desire to view previously browsed, or "last browsed," information.

Then, irrespective of a prior graphical display and in response to receiving the selection data, the control device may identify browse data that was most-recently accessed by the control device. In an embodiment, the browse data may include an indication of one or more playable media items. The playable media items may generally correspond to various playable media previously (or most-recently) browsed by a user, and may or may not include a playable media item that is currently being played by a playback device. In this way, the control device may provide a convenient and intuitive way to allow a user to return to previously-browsed playable media item information, regardless of what other actions the user may have engaged in and/or what other graphical displays the user may have accessed since previously browsing the playable media item information.

As noted above, the browse data that was most-recently accessed by the control device may be identified irrespective of a prior graphical display. Thus, unlike a selectable "back button" as known in the art, the present method does not involve merely returning a user to a previously-viewed graphical display. Instead, the method involves presenting the user with the most-recently accessed browse data corresponding to the one or more playable media items, regardless of any other interaction the user may have had with the control device.

Ultimately, after identification of the browse data that was most-recently accessed by the control device, the control device may then cause the graphical display to provide a visual indication of the one or more playable media items indicated by the identified browse data.

As indicated above, the present application involves methods and systems for providing an indication of information previously accessed, or "browsed," by a user of a computing device, irrespective of a prior graphical display. An example method involves causing, by a control device, a graphical display to provide a visual indication of a selectable region. The method further involves receiving, at the control device, selection data that indicates a selection of the selectable region. The method also involves, irrespective of a prior graphical display and in response to receiving the selection data, identifying, by the control device, browse data that was most-recently accessed by the control device, where the browse data includes an indication of one or more playable media items. Finally, the method also involves causing, by the control device, the graphical display to provide a visual indication of the one or more playable media items indicated by the identified browse data.

In another aspect, a non-transitory computer readable memory is provided. The non-transitory computer readable memory has stored thereon instructions executable by a computing device to cause the computing device to execute functions. The functions include causing, by a control device, a graphical display to provide a visual indication of a selectable region. The functions further involve receiving, at the control device, selection data that indicates a selection of the selectable region. The functions also involve, irrespective of a prior graphical display and in response to receiving the selection data, identifying, by the control device, browse data that was most-recently accessed by the control device, where the browse data includes an indication of one or more playable media items. Finally, the functions also involve causing, by the control device, the graphical display to provide a visual indication of the one or more playable media items indicated by the identified browse data.

In another aspect, a device is provided. The device includes a processor and computer readable medium having stored thereon instructions executable by the processor to perform function. The functions include causing, by a control device, a graphical display to provide a visual indication of a selectable region. The functions further involve receiving, at the control device, selection data that indicates a selection of the selectable region. The functions also involve, irrespective of a prior graphical display and in response to receiving the selection data, identifying, by the control device, browse data that was most-recently accessed by the control device, where the browse data includes an indication of one or more playable media items. Finally, the functions also involve causing, by the control device, the graphical display to provide a visual indication of the one or more playable media items indicated by the identified browse data.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
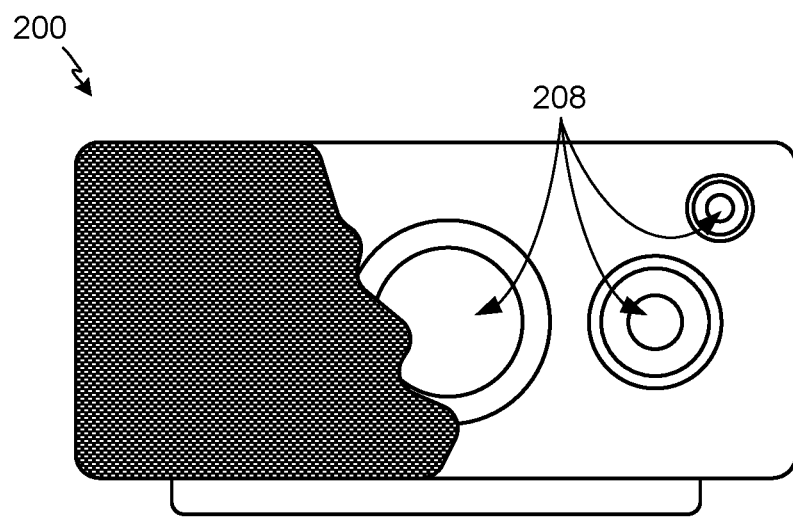
FIG. 2A shows an illustration of an example zone player having a built-in amplifier and transducers.
Figure 2B:
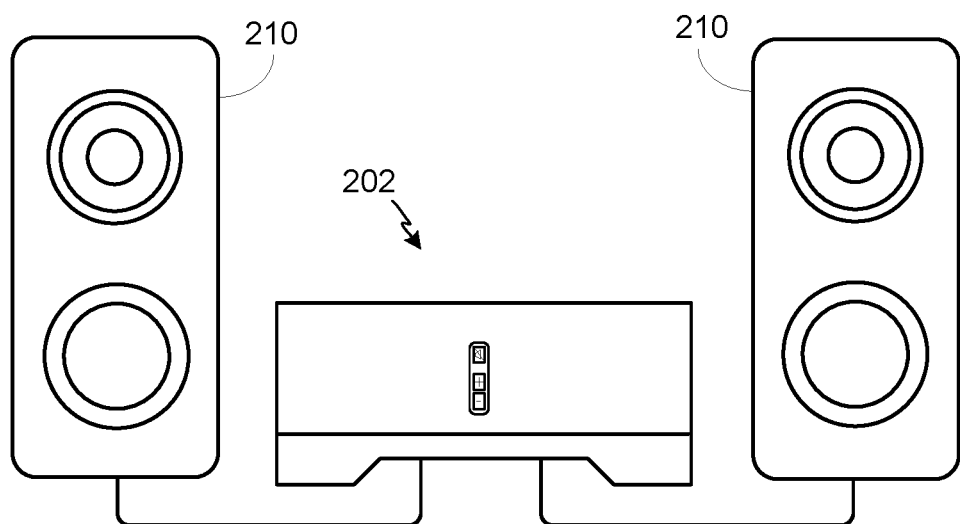
FIG. 2B shows an illustration of an example zone player having a built-in amplifier and connected to external speakers.
Figure 2C:
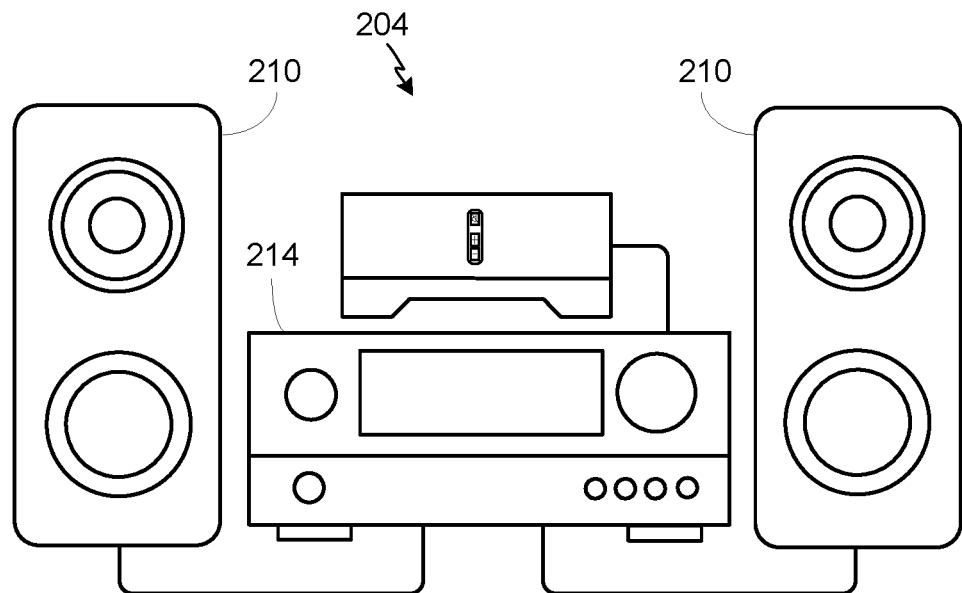
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, each of zone players 200-204 may also be referred to as a "smart speaker," because each zone player contains processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power and/or amplify sound to a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue generally contains information corresponding to one or more playable audio items by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction or play, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
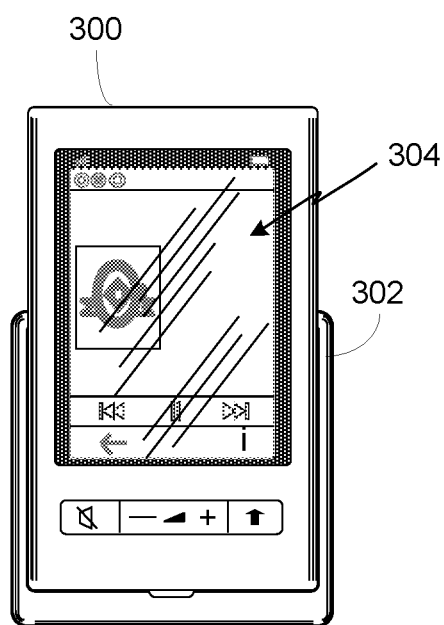
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™ ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128.

Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room, then the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. For example, considering the scenario above, the individual on the patio may go inside the house in the middle of a jazz track. In particular, for instance, the individual may leave the patio at a time of 1:54 in the jazz track, i.e., the track has been playing for one minute and fifty-four seconds from the beginning of the track. Despite taking time, e.g., a few minutes, for the individual to walk from the patio and up the stairs to the office, zone player 102 may begin playing the jazz track at 1:54 as the individual enters the office. Essentially, the individual is able to listen to the entire jazz track regardless of where he/she is located in the house. In some instances, controller 130 may identify the last played or possibly last browsed media content and utilize this data with data network 128 and zone players 102-124. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
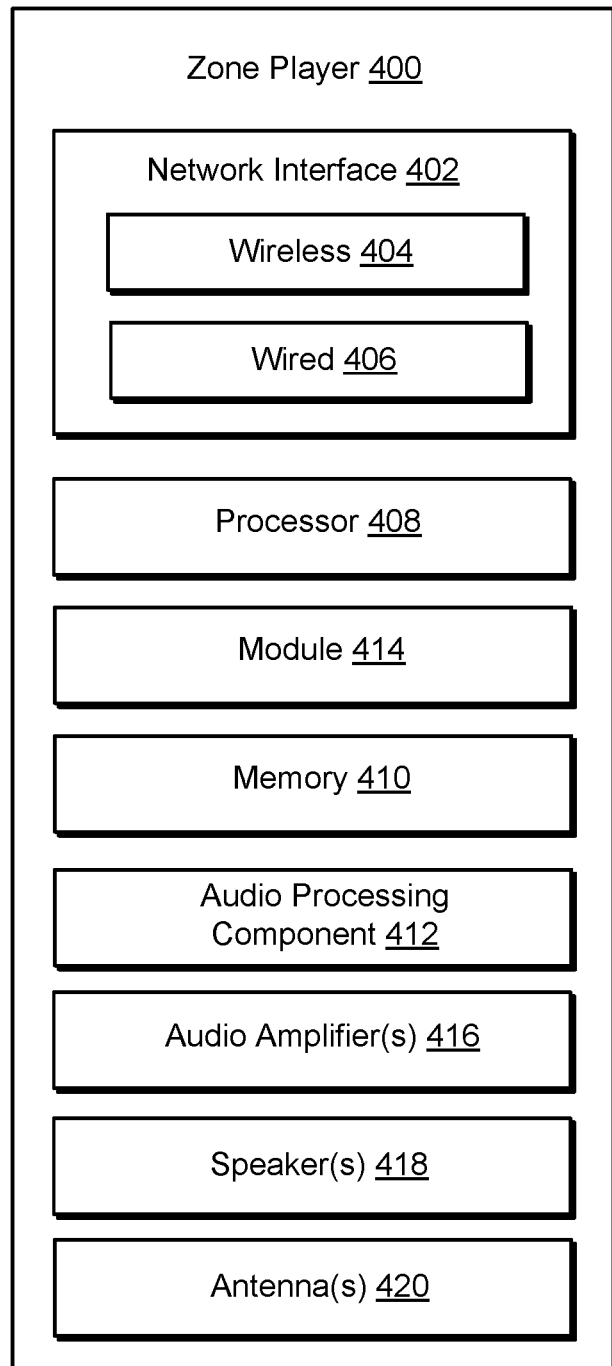
FIG. 4 shows an internal functional block diagram of an example zone player.

Referring now to FIG. 4, there is shown an example block diagram of a zone player 400 (referred to elsewhere herein as a "playback device") in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
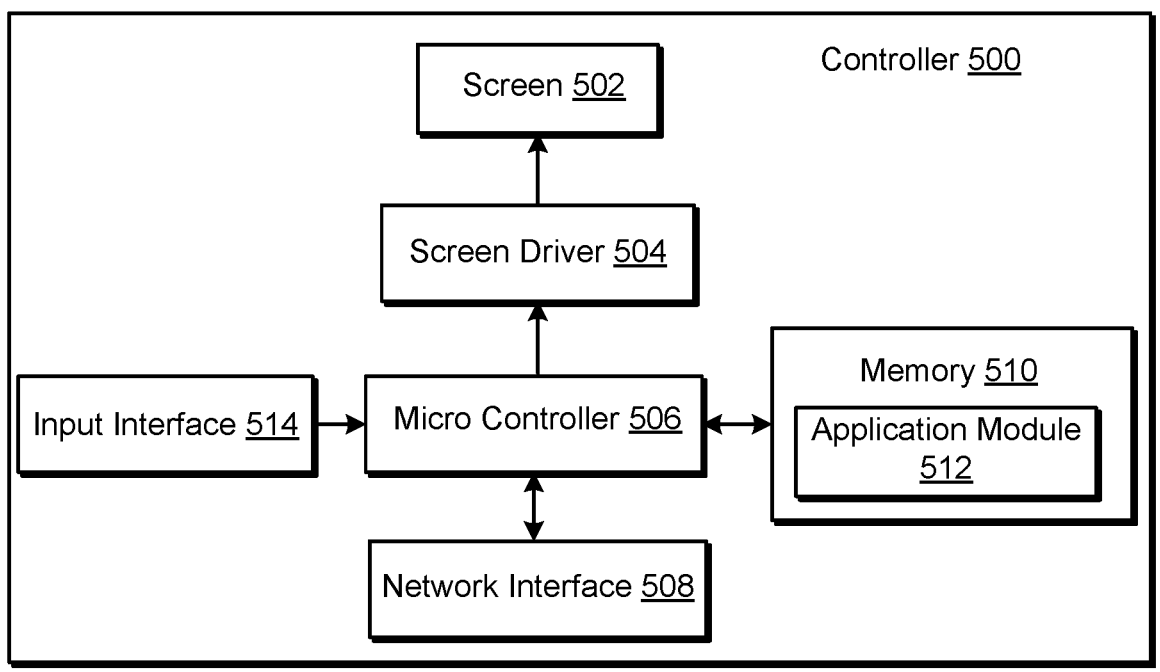
FIG. 5 shows an internal functional block diagram of an example controller.

Referring now to FIG. 5, there is shown an example block diagram for controller 500 (or "control device"), which can correspond to the controlling device 130 in FIG. 1. Controller 500 can be used to facilitate the control of multimedia applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 502 communicates with and is commanded by a screen driver 504 that is controlled by a microcontroller (e.g., a processor) 506. Screen 502 may be arranged to provide any required graphical display as described in connection with the methods below, including, for example, any one of example graphical displays 9A, 9B, 11, and/or 12.

The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
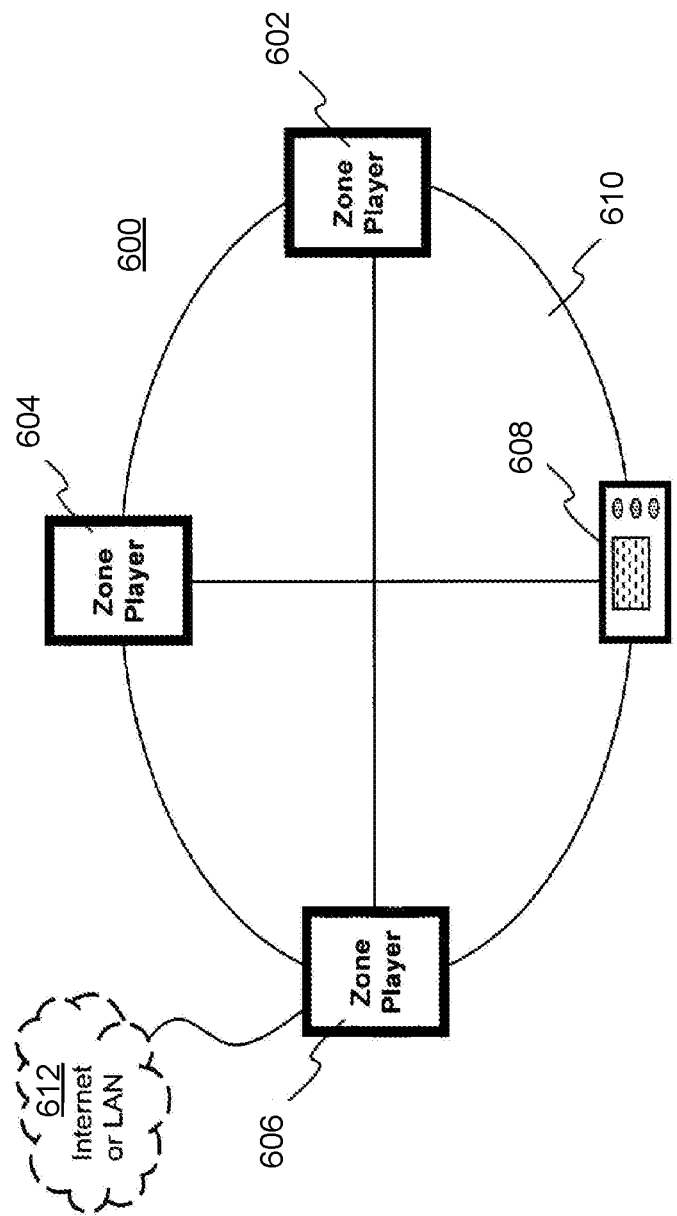
FIG. 6 shows an example ad-hoc playback network.

Particular examples are now provided in connection with FIG. 6 to describe, for purposes of illustration, certain embodiments to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless technologies. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped (or ungrouped) to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Another Example System Configuration

Figure 7:
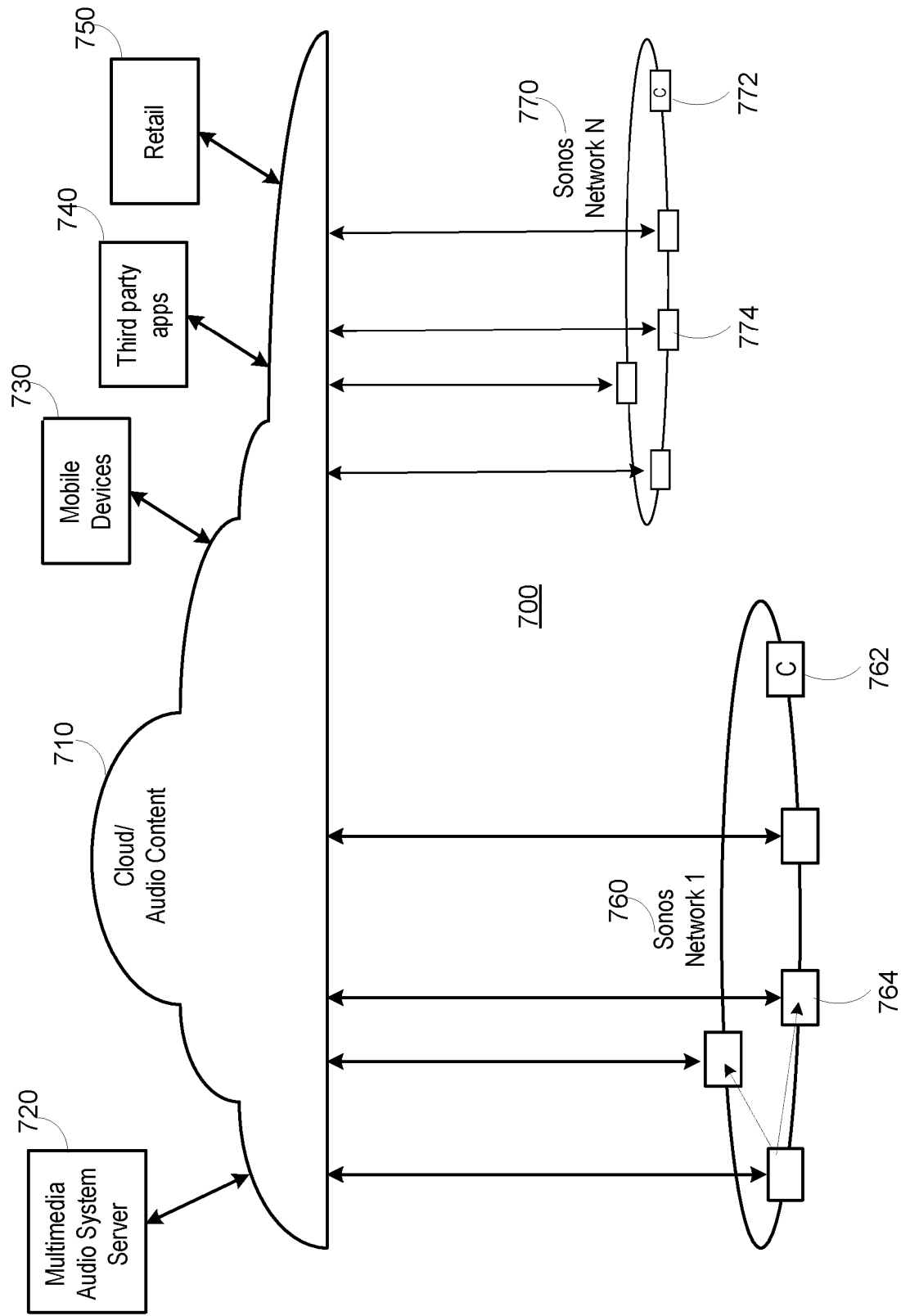
FIG. 7 shows a system including a plurality of networks including a cloud-based network and at least one local playback network.

FIG. 7 shows a system 700 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

Figure 8:
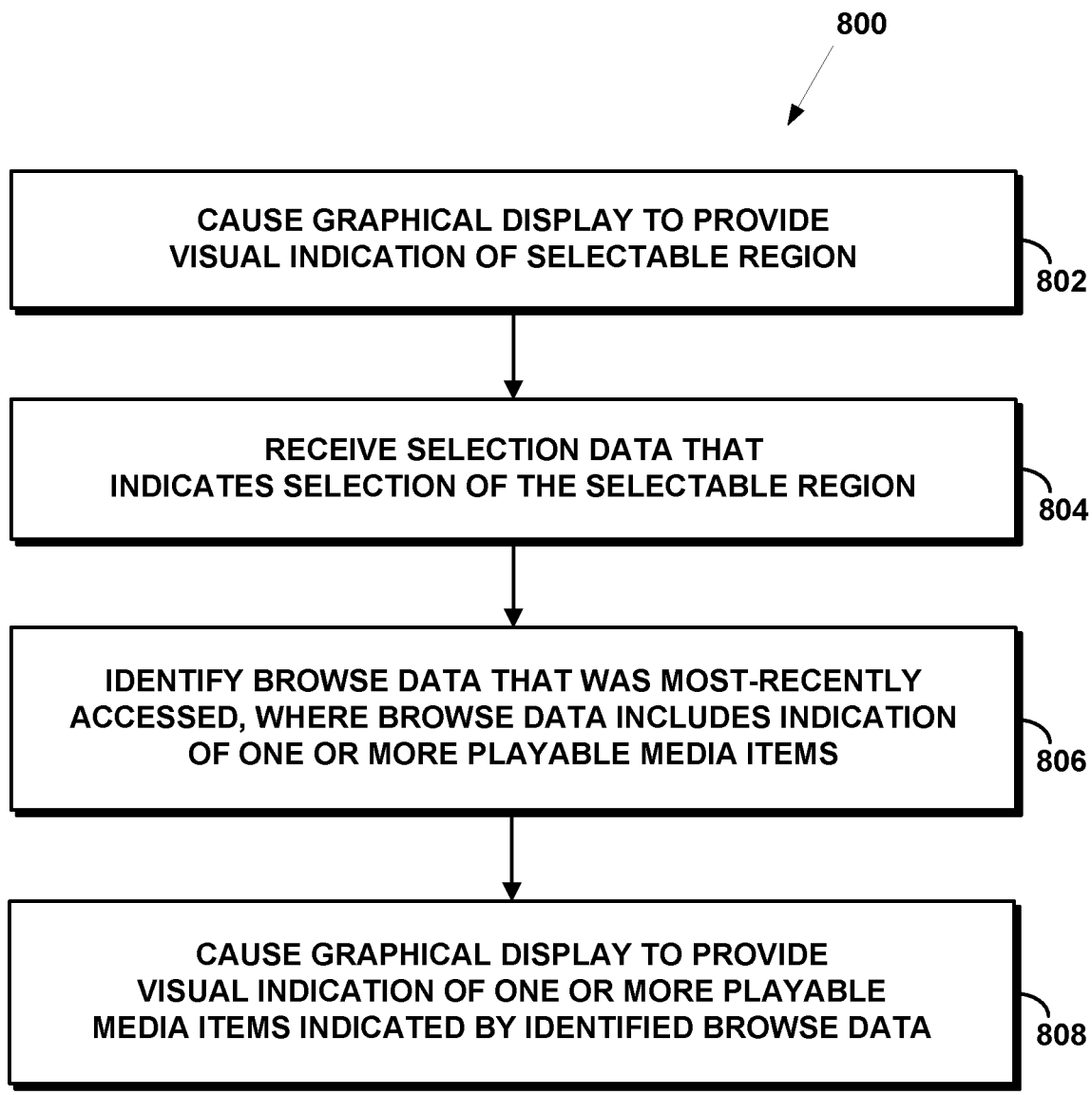
FIG. 8 shows an example flow diagram for providing an indication of information last browsed by a user of a first control device.

As illustrated by the example system 700 of FIG. 8, a plurality of content providers 720-750 can be connected to one or more local playback networks 760-770 via a cloud and/or other network 710. Using the cloud 710, a multimedia audio system server 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VIII. Example Indication of Media Content Information Previously Accessed

As indicated above, the present application discloses example systems and methods for providing an indication of media content information previously accessed, or "browsed," by a user of a media playback system control device, such as, for example, controller 500 as described above. In an embodiment, the indication of media content information previously browsed may correspond to media content information most-recently browsed, or "last browsed," by one or more network-connected control devices.

FIG. 8 shows an example flow diagram 800 for providing an indication of media content information last browsed by a user of a control device, in accordance with at least some embodiments described herein. Method 800 shown in FIG. 8 presents an embodiment of a method that could be used in the environments 100, 600, and 700 with the systems 200, 202, 204, 300, 400, and 500 for example, in communication with one or more devices, such as those illustrated in FIGS. 2-5. Method 800 may include one or more operations, functions, or actions as illustrated by one or more of blocks 802-808. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, the method 800 involves causing, by a control device, a graphical display to provide a visual indication of a selectable region. The control device may be any suitable control device including, for example, that described above in connection with FIGS. 3 and 5. The graphical display may be any suitable graphical display communicatively coupled to the control devices and may be remote from and or local to the control device. In an embodiment, the graphical display may be physically integrated with the control device. For instance, the graphical display may take the form of a screen that is a part of the control device, such as screen 502 described above in connection with controller 500 shown in FIG. 5.

Figure 9B:
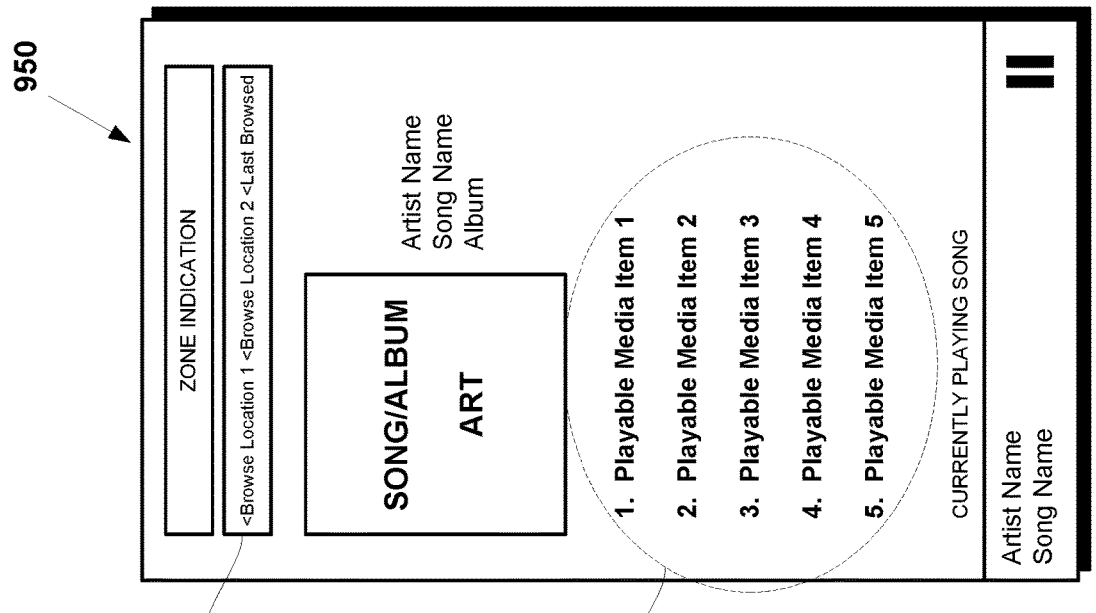
FIG. 9B shows a second example graphical display provided by a control device.
Figure 9A:
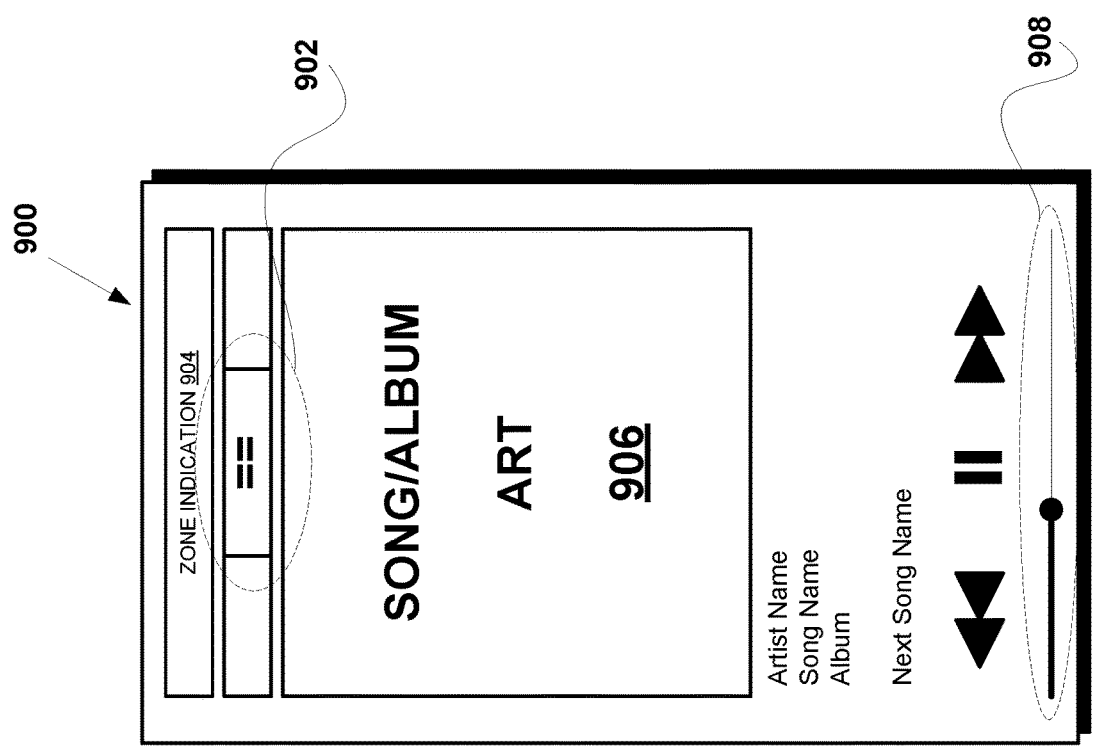
FIG. 9A shows a first example graphical display provided by a control device.

FIG. 9A shows an example graphical display 900 provided by a control device in accordance with method 800. As shown, graphical display 900 includes selectable region 902. Selectable region 902 may be selected by a user in any suitable fashion, as discussed further below. In an embodiment where the graphical display corresponds to a touch interface, selectable region 902 may be selectable by the proximity of a human hand, the touch of a human finger, or a stylus to the touch interface, among other examples. In an embodiment where the graphical display does not correspond to a touch interface, selectable region 902 may be selected by use of a pointer device coupled to the control device, such as a mouse. Other examples may exist.

The visual indication of selectable region 902 may take any suitable form, including a form different from the specific example depicted in FIG. 9A. As but a few examples, the selectable region 902 may include letters and/or words (such as "last browsed"), or some other visual queue that selection of selectable region 902 will result in the presentation of "last-browsed" media content information (such as some indication of one or more playable media items associated with the last-browsed media content information).

Graphical display 900 is shown as also including elements other than selectable region 902. However, it should be understood that no other additional elements need to be displayed. These other elements, discussed further below, are shown for purposes of example and explanation only. In a given embodiment, and at a given point in time, such elements as well as other elements not shown, may be displayed by the graphical display coincident with the display of selectable region 902.

Graphical display 900 is shown as including zone indication 904. Zone indication 904 may indicate a particular zone player and/or group of zone players at which a song is currently being played. Graphical display 900 is also shown as including song/album art 906. Song/album art 906 may provide any suitable and/or desirable graphical representation of a song that is currently being played, such as song art and/or album art associated with the song. However, neither zone indication 904 nor song/album art 906 need necessarily be displayed.

Graphical display 900 may include (but may not necessarily include) any other of a number of additional visual indications including, as just a few examples, an indication of artist name, song name, album name, and the name of a next song to be played, among other examples. Further, graphical display 900 may include a number of additional selectable regions including, as just a few examples, a forward button, a back button, a pause button, and/or a play button, among other examples. Further still, graphical display 900 may include other various visual indications corresponding to status of the system (i.e., playback of a given media item) including, for example, a volume level and a time progression, among other examples.

In accordance with the above discussion of the various information that may be displayed by graphical display 900, block 802 of method 800 may further involve, while causing the graphical display to provide the visual indication of the selectable region, causing, by the control device, the graphical display to provide a visual indication of a playback status associated with playback of a first playable media item. Such an indication of the playback status may take various forms, and may include one or more various pieces of information. For example, the indication may include a general indication that a given song is playing, such as an indication of song/album art 906 and/or an indication of artist name, song name, and/or album name, as described above. As another example, the indication of playback status may include an indication of time progression 908, which may indicate the total time and time elapsed of a currently-playing song. Other examples of the indication of the playback status may exist as well.

Moreover, in some embodiments selectable region 902 may only be displayed by the graphical display in certain situations. For example, selectable region might only be displayed if media content information was previously browsed by the control device. In one instance, the selectable region might only be displayed if media content information was previously browsed since the last time the control device was turned "on." In another instance, the selectable region might only be displayed if media content information was previously browsed less than a threshold amount of time before the current time. Other examples may exist. In this way, and according to this embodiment, selectable region 902 may only be displayed if there is associated previously browsed media content information that may be desirable to provide to the user.

Returning now to FIG. 8, at block 804, the method 800 involves receiving, at the control device, selection data that indicates a selection of the selectable region. The selection data may be received in response to a user input corresponding to the selection of selectable region 902. As noted above, in an embodiment where the graphical display corresponds to a touch interface, selectable region 902 may be selected by the touch of a finger or a stylus, among other examples. In an embodiment where the graphical display does not correspond to a touch interface, selectable region 902 may be selected by use of a pointer device coupled to the control device, such as a mouse. Other examples may exist. In an embodiment where the graphical display is physically integrated into the control device as a touch interface, the selection data may be communicated directly from the touch interface to a processor of the control device for further action. In an embodiment where the graphical display is not physically integrated into the control device, the selected data may be communicated to the control device (and, more specifically, a processor of the control device) over one or more communication links.

At block 806, the method 800 involves, irrespective of a prior graphical display and in response to receiving the selection data, identifying, by the control device, browse data that was most-recently accessed by the control device, where the browse data includes an indication of one or more playable media items. In an implementation where the selectable region is displayed in connection with an indication of a status of a media item that is being played back at a playback device, the one or more playable media items included in the browse data may include the playable media item that is currently being played. However, this is not necessary. In another implementation, the one or more playable media items included in the browse data may not include the playable media item that is currently being played. And in another implementation, as discussed further below, the graphical display on which the selectable region is displayed may not indicate a playable media item that is currently being played whatsoever.

As noted, the browse data includes, among potentially other types of media content information, an indication of one or more playable media items. Such playable media items may correspond to a category, group, and/or list of playable media items that that the user previously "browsed" for potential selection for playback. As one example, the one or more playable media items may include a list of songs included in a given album that the user previously browsed. As another example, the one or more playable media items may include a list of songs associated with a given genre of music, such as "indie" or "hip-hop," that the user previously browsed. As yet another example, the one or more playable media items may include a list of songs associated with a customized playlist of songs previously created by the user. Other examples may exist as well.

Beyond an identification of a given playable media item itself, the browse data may include any other suitable information corresponding to the given playable media item. As but a few examples, the browse data may include, for each playable media item, a respective track name, a respective artist name, and a respective play time. Other examples of such information may exist.

The browse data may further include information for retrieving, acquiring, obtaining, or otherwise ultimately playing the playable media item at a playback device. For instance, the browse data may include, for each playable media item, a respective universal resource identifier (URI) that indicates a network location of the playable media item. Additionally, the browse data may include, for each playable media item, an identification of a service provider associated with the media item and/or a security key required for access of the playable media item. Other examples of such information may exist.

The browse data may further include other information related to a user's browse history. For instance, the browse data may indicate a browse history that led to a user browsing the one or more playable media items that are included in the browse data. For instance, a browse history associated with a given artist's album may indicate a browse history corresponding to a user previously browsing media corresponding to a genre (e.g., "indie") associated with the album, then browsing media corresponding to a particular artist, and then browsing media corresponding to the particular album. Alternatively, the browse history associated with a given user's playlist entitled "running playlist 1" may indicate a browse history corresponding to the user browsing media corresponding to all playlists, then browsing media corresponding to a category of playlists associated with working out, then browsing media corresponding to a category of playlists associated with running, and then the particular "running playlist 1." Other examples may exist as well.

In accordance with method 800 (and block 806, specifically), the control device may be configured to store browse data in a location that is accessible by the control device for purposes of executing block 806. The last browse data may be stored local to the control device, or remote to the control device (as discussed further below). In an embodiment where the browse data is stored locally, the browse data may be stored in any suitable data memory location including, as but one example, memory 510 as discussed above with respect to example controller 500.

In an embodiment, the browse data may be stored in a particular memory location (or data store) that is allocated for storage of such last browse data. Accordingly, the last browse data stored in that particular memory location may be updated by the control device as the user browses various playable media items. For instance, after a user browses a first album, the last browse data store may be updated with browse data corresponding to that first album. If after browsing the first album, the user browses a second album, the last browse data store may be updated with browse data corresponding to that second album. In this way, the last browse data store will always maintain browse data associated with the user's most-recent browse activity. Therefore, identifying the browse data that was most-recently accessed by the control device in accordance with block 806 may involve accessing the browse data stored in such a last browse data store.

Other examples of identifying the browse data that was most-recently accessed by the control device may exist as well. For example, the control device may continuously monitor and store information regarding a user's browse activity. This may involve storing information about browse functions previously performed, such as "browse first album" or "browse second album." In this case, identifying the browse data that was most-recently accessed may involve re-executing the most-recently performed browse function and obtaining the browse data associated with that browse data. Still other examples may exist as well.

As noted above, in an implementation where the selectable region is displayed in connection with an indication of a status of a media item that is being played back at a playback device, the one or more playable media items included in the browse data may include the playable media item that is currently being played. In accordance with such an implementation, the identification of browse data that was most-recently accessed by the control device at block 806 may further involve identification of browse data that was most-recently accessed by the control device that initiated playback of the media item that is currently being played.

Thus, in one situation, a first control device may provide a graphical display that contains an indication of selectable region 902, and that graphical display may also contain an indication of a status of a media item that is being played, where the playback of the media item was initiated by a second control device. Thus, in response to the receipt of selection data in connection with block 804, the first control device may identify browse data that was most-recently accessed by the second control device, i.e., the control device that initiated playback of the media item that is currently being played. In this way, a user of the first control device may ultimately be provided browse data that is associated with selection of the media item that is currently being played, by a user of the second control device.

At block 808, method 800 involves causing, by the control device, a graphical display to provide a visual indication of the one or more playable media items indicated by the identified browse data. The graphical display may be the same, or different from the graphical display referred to above with respect to block 802. As such, the graphical display may be any suitable graphical display communicatively coupled to the control device and may be remote from and or local to the control device. In an embodiment, the graphical display may be physically integrated with the control device. For instance, the graphical display may take the form of a screen that is a part of the control device, such as screen 502 described above in connection with controller 500 shown in FIG. 5.

FIG. 9B shows an example graphical display 950 provided by a control device in accordance with step 808 of method 800. As shown, graphical display 950 includes an example visual indication of one or more playable media items 954 (such as those that may be indicated by the browse data identified in accordance with block 806). Graphical display 950 also includes various other elements including an example visual indication of a browse history 952. Such an indication of browse history may correspond to the browse-history information discussed above. Graphical display 950 may include any other of a number of additional visual indications including, as just a few examples, an indication of artist name, song name, and album name, among other examples. Further, graphical display 950 may include a number of additional selectable regions including, as just a few examples, a forward button, a back button, a pause button, and/or a play button, among other examples. Further still, graphical display 950 may include various other visual indications similar to those provided on graphical display 900 such as a zone indication and/or an indication of song/album art. Other examples may exist.

Further, as noted above, in accordance with block 806, the browse data that was most-recently accessed by the control device may be identified irrespective of a prior graphical display and then presented to the user in accordance with block 808. Thus, unlike a selectable "back button" as known in the art, block 806 of the present method does not involve merely returning a user to a previously-viewed graphical display. Instead, the method involves presenting the user with the most-recently accessed browse data corresponding to the one or more playable media items, regardless of any other interaction the user may have had with the control device.

In one example, a user first browses to the one or more playable media items (as indicated in graphical display 950 as playable media items 954), then browses to a screen not related to the playable media items (such as a "settings" screen, an "information" screen, or a "queue" screen, among other examples), and then browses to graphical display 900, selection of selectable region 902 will nonetheless result in presentation of graphical display 950. And this will be the case regardless of whether, for instance, the song/album art 906 displayed by graphical display 900 corresponds to any one of playable media items 954. That is, the user may very well have "last browsed" playable media items other than a media item that is currently being played back at the time of selection of selectable region 902, and those "last browsed" playable media items will nonetheless be displayed in accordance with block 808 and graphical display 950.

In another example, a selectable region such as selectable region 902 may be implemented on a graphical display that is different in some respects from graphical display 900. For instance, selectable region 902 may be implemented on a graphical display that does not include an indication of a playable media item that is currently being played back (such as a "settings" screen, or an "information" screen, among other examples). Thus, as a result, a user may access the last browsed media content information indicated on example graphical display 950 from any desirable initial graphical display, regardless of the other information provided on the initial graphical display, and regardless of what computing activity led the user to the initial graphical display.

As discussed further below, method 800 may generally be carried out after the user initially browses to and/or accesses various media content information including, for example, the playable media items that are indicated as part of the browse data. Then, the selectable region may be displayed as part of any desired graphical display regardless of any other activity the user may engage in after initially accessing the media content information but before carrying out method 800.

Accordingly, before causing the graphical display to provide a visual indication of a selectable region in accordance with block 802, the control device may cause the graphical display to provide a visual indication of the one or more playable media items that are later indicated as part of the browse data. This may be done in response to browse activity performed by a user. Then, after causing the graphical display to provide a visual indication of the one or more playable media items and before causing the graphical display to provide a visual indication of a selectable region, the control device may cause the graphical display to provide a visual indication of a queue of at least one playable media item queued for playback at a playback device. This may be done in response to other computing activity performed by the user. After doing so, the control device may then proceed with execution of the blocks discussed above in connection with example method 800, thus displaying the last browse data irrespective of the user accessing the visual indication of the queue after browsing the one or more playable media items.

In another implementation, before causing the graphical display to provide a visual indication of a selectable region, the control device may cause the graphical display to provide a visual indication of the one or more playable media items. Then, after causing the graphical display to provide a visual indication of the one or more playable media items and before causing the graphical display to provide a visual indication of a selectable region, the control device may cause the graphical display to provide a visual indication of a system setting associated with the control device. This may be done in response to the other computing activity that involves the user accessing a settings interface. After doing so, the control device may proceed with execution of the blocks discussed above in connection with example method 800.

Figure 10A:
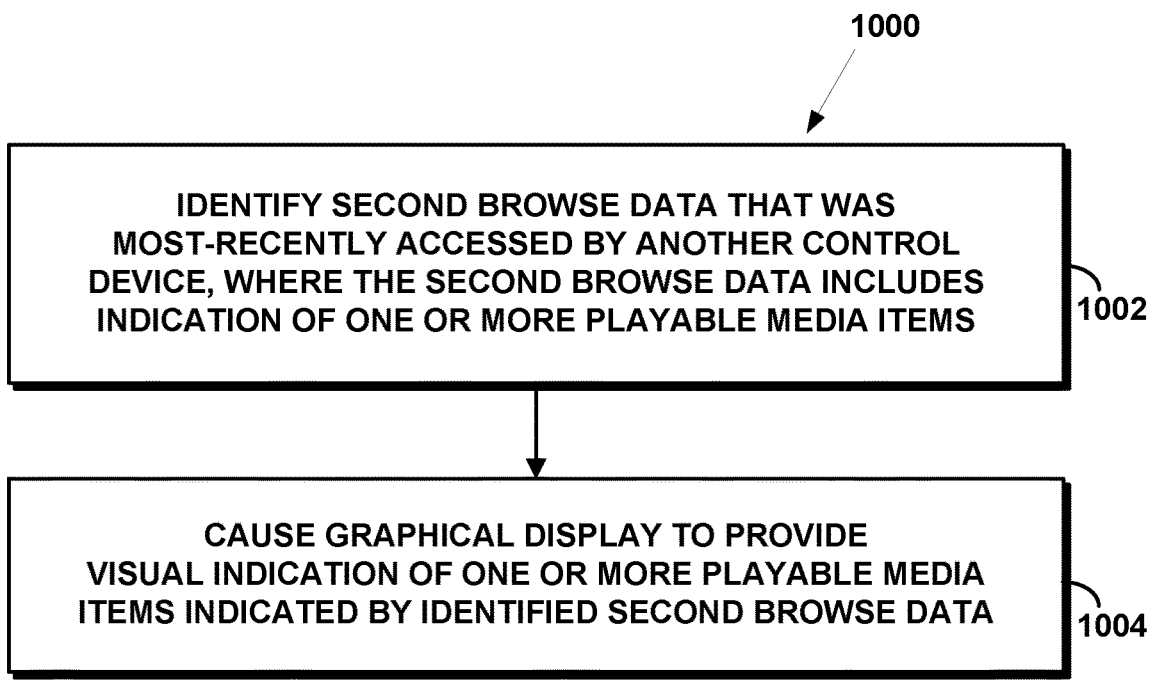
FIG. 10A shows an example flow diagram for providing an indication of information last browsed by a user of a second control device.

Turning now to FIG. 10A, an example flow diagram 1000 for providing an indication of information last browsed by a user of another computing device is shown, in accordance with at least some embodiments described herein. Method 1000 shown in FIG. 10A presents an embodiment of a method that could be used after, or in combination with, method 800 described above in connection with FIG. 8. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1002, method 1000 involves, irrespective of a prior graphical display and in response to receiving the selection data, identifying, by the control device, second browse data that was most-recently accessed by another control device, where the second browse data includes an indication of one or more playable media items. For purposes of explanation, the control device that identifies the second browse data in accordance with block 1002 will be referred to below as a "first control device." Whereas, the other control device that previously accessed the second browse data referred to in accordance with block 1002 will be referred to below as a "second control device." In an implementation, both the first control device and the second control device may be network connected, and may both be arranged to control at least one common playback device.

For purposes of example and explanation consider that the first control device may be a mobile device, such as a mobile smart phone, of a first user of a media system. The second control device may be a mobile device, such as a mobile tablet device, of a second user of a media system. Both the mobile smart phone and the mobile tablet device may be arranged to control the at least one common playback device. However, the users of the respective devices may engage in different browse activities at each of the respective devices.

The identification of the second browse data that was most-recently accessed by the second control device may be performed similar to the identification of the browse data discussed above. In one implementation, the second browse data may be stored local to the first control device. In such an implementation, the second browse data may be communicated from the second control device to the first control device. In another implementation, the second browse data may be stored remote from the first control device. In such an implementation, the second browse data may be stored at the second control device. Alternatively, the second browse data may be stored at a playback device. In such an implementation where the second browse data is stored remote from the first control device, the first control device may access the second browse data over the network at the time that it identifies the second browse data that was most-recently accessed by the second control device in accordance with block 1002.

At block 1004, method 1000 involves causing, by the control device, the graphical display to provide a visual indication of the one or more playable media items indicated by the identified second browse data. The graphical display provided in accordance with block 1004 may be similar, in some respects, to graphical display 950 discussed above in connection with block 808. In some implementations, the graphical display provided in accordance with block 1004 may provide a visual indication of the one or more playable media items indicated by the identified second browse data, and may not provide a visual indication of any other browse data. In other implementations, the graphical display provided in accordance with block 1004 may provide a visual indication of the one or more playable media items indicated by the second browse data identified in accordance with block 1002, and may also provide a visual indication of the one or more playable media items indicated by the browse data identified in accordance with block 806 above.

Figure 11:
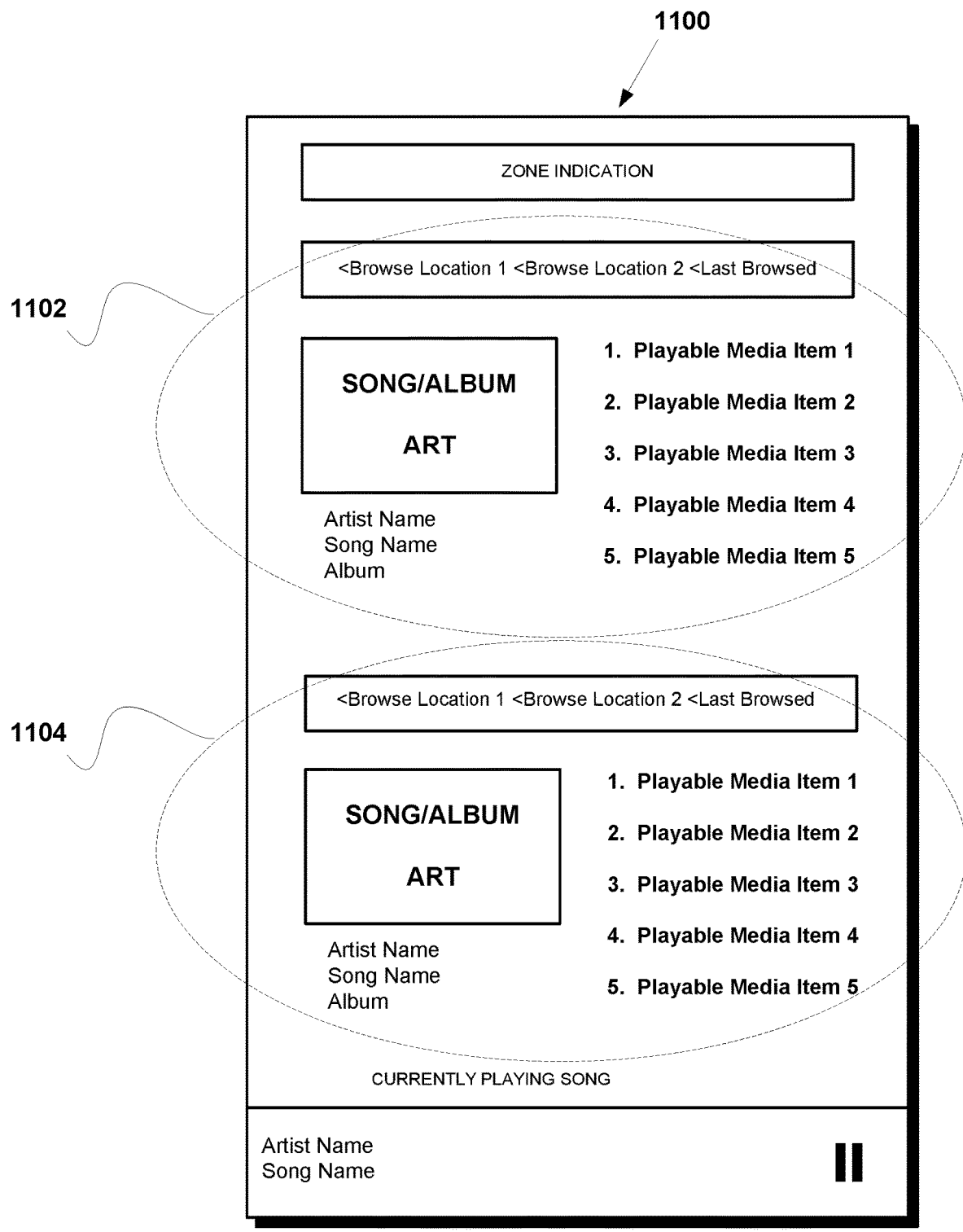
FIG. 11 shows a third example graphical display provided by a control device.

Example graphical display 1100 as shown in FIG. 11 provides an example of the latter implementation of such a graphical display. As shown in graphical display 1100, the graphical display provided in accordance with block 1004 may include first browse information 1102 (corresponding, for instance, to the one or more playable media items indicated by the browse data identified in accordance with block 806) and may also include second browse information 1104 (corresponding, for instance, to the one or more playable media items indicated by the second browse data identified in accordance with block 1002). Other examples may exist.

Figure 10B:
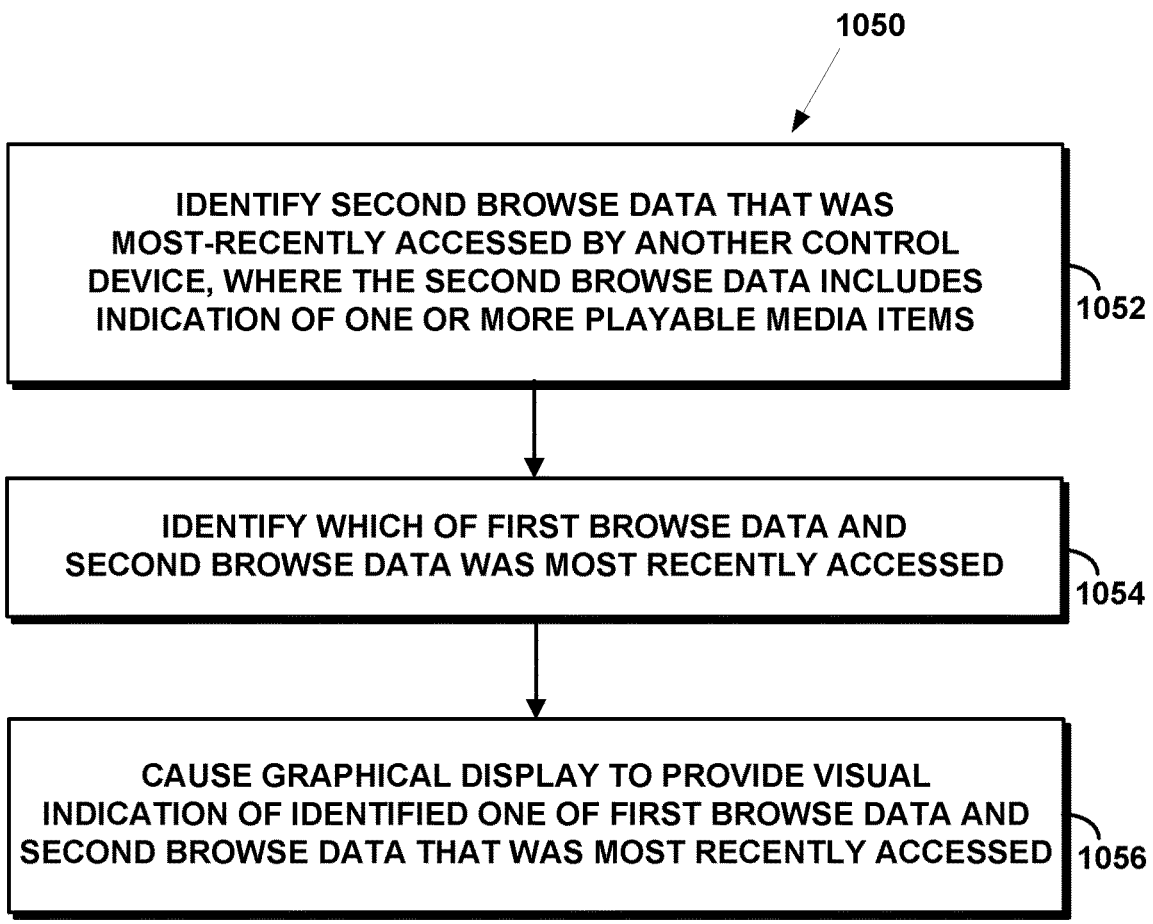
FIG. 10B shows an example flow diagram for providing an indication of information last browsed by either a user of the first control device or a user of the second control device.

FIG. 10B shows an example flow diagram 1050 for providing an indication of information last browsed by either a user of a first computing device or a user of another second computing device, in accordance with at least some embodiments described herein. Method 1050 shown in FIG. 10B presents an embodiment of a method that could be used after, or in combination with, either method 800 described above in connection with FIG. 8 and/or method 1000 described above in connection with FIG. 10A. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 1052, method 1050 involves irrespective of a prior graphical display and in response to receiving the selection data, identifying, by the control device, second browse data that was most-recently accessed by another control device, where the second browse data includes an indication of one or more playable media items. Block 1052 may be executed by the control device in a similar manner to block 1002 described above with respect to method 1000. For purposes of explanation, the control device that identifies the second browse data in accordance with block 1052 will be referred to below as a "first control device." Whereas, the other control device that previously accessed the second browse data referred to in accordance with block 1052 will be referred to below as a "second control device." Moreover, any browse data associated with browse functions performed by the first control device will be referred to as "first browse data." In an implementation, both the first control device and the second control device may be network connected, and may both be arranged to control at least one common playback device.

At block 1054, method 1050 involves identifying which of the first browse data and the second browse data was most recently accessed. That is, block 1054 involves identifying whether the first control device accessed the first browse data most recently or whether the second control device accessed the second browse data more recently. The first browse data may be stored local to or remote from the first control device, as described above. And the second browse data may be stored at the first control device or remote from the first control device (e.g., at the second control device, or a playback device), as described above.

In accordance with block 1054, in one implementation, the first browse data and the second browse data may include a time stamp used by the first control device to identify which of the first browse data and the second browse data was most recently accessed. In another implementation, the first browse data and the second browse data may be stored in the same last browse data store, such that the browse data stored in the last browse data store is continuously updated with browse data from either the first control device or the second control device that was most recently accessed.

Thus, in an implementation, identifying which of the first browse data and the second browse data was most recently accessed may involve the first control device comparing the first browse data to the second browse data. Then, the first control device may determine, based on the comparison of the first browse data and the second browse data, which of the first browse data and the second browse data that is most recent.

Other examples of identifying which of the first browse data and the second browse data was most recently accessed certainly exist.

Figure 12:
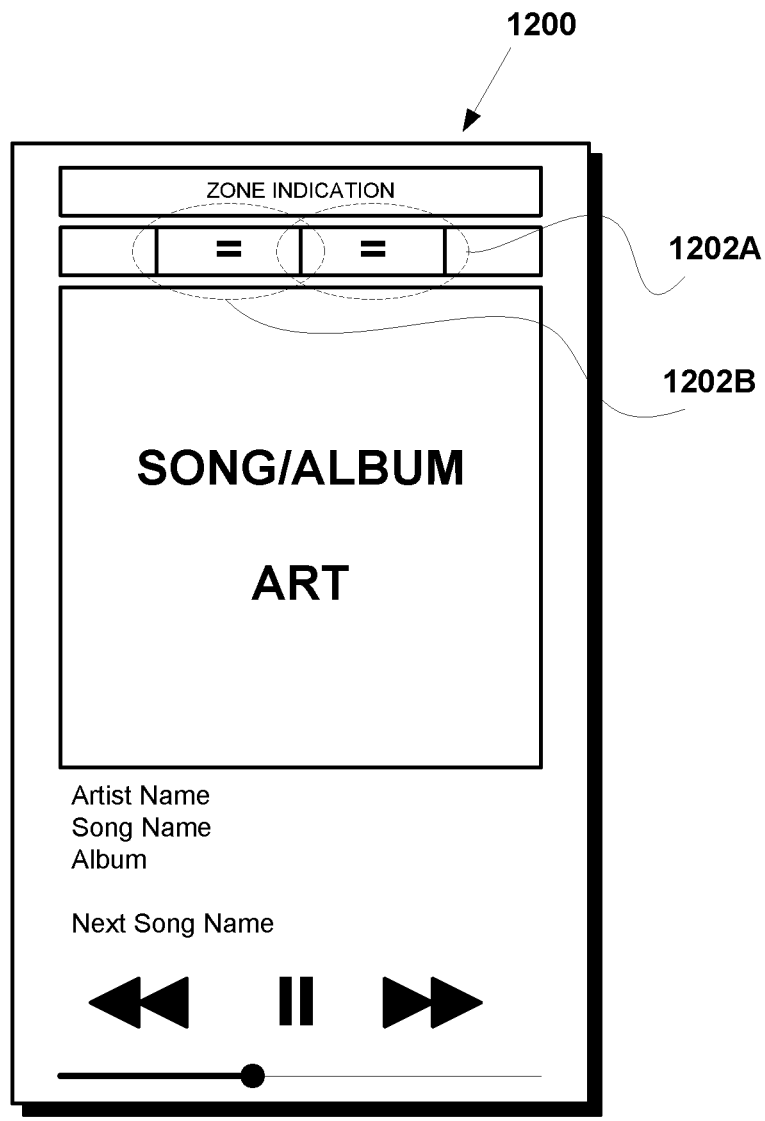
FIG. 12 shows a fourth example graphical display provided by a control device.

Now, with reference to FIG. 12, an additional example graphical display 1200 is shown. Graphical display 1200 includes an example selectable region (or pair of example selectable regions) 1202A and 1202B. In accordance with this example, the control device may be configured to display different browse data based on which of the selectable regions a user selects. For instance, if the user selects selectable region 1202A, the control device may, in response, display browse data associated with the control device. On the other hand, if the user selects selectable region 1202B, the control device may, in response, display browse data associated with another control device. Such functions may be carried out in accordance with any of the functions described above with respect to FIGS. 8, 10A, and/or 10B.

VII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the above describes example systems, methods, apparatus, and/or articles of manufacture, the examples provided are not the only way(s) to implement such systems, methods, apparatus, and/or articles of manufacture.

As suggested above, the present application herein involves providing an indication of information previously accessed, or "browsed," by a user on a control device of a media playback system, irrespective of a prior graphical display that the user accessed on the control device. An example method involves causing, by a control device, a graphical display to provide a visual indication of a selectable region. The method further involves receiving, at the control device, selection data that indicates a selection of the selectable region. The method also involves, irrespective of a prior graphical display and in response to receiving the selection data, identifying, by the control device, browse data that was most-recently accessed by the control device, where the browse data includes an indication of one or more playable media items. Finally, the method also involves causing, by the control device, the graphical display to provide a visual indication of the one or more playable media items indicated by the identified browse data.

In another aspect, a non-transitory computer readable memory is provided. The non-transitory computer readable memory has stored thereon instructions executable by a computing device to cause the computing device to execute functions. The functions include causing, by a control device, a graphical display to provide a visual indication of a selectable region. The functions further involve receiving, at the control device, selection data that indicates a selection of the selectable region. The functions also involve, irrespective of a prior graphical display and in response to receiving the selection data, identifying, by the control device, browse data that was most-recently accessed by the control device, where the browse data includes an indication of one or more playable media items. Finally, the functions also involve causing, by the control device, the graphical display to provide a visual indication of the one or more playable media items indicated by the identified browse data.

In another aspect, a device is provided. The device includes a processor and computer readable medium having stored thereon instructions executable by the processor to perform function. The functions include causing, by a control device, a graphical display to provide a visual indication of a selectable region. The functions further involve receiving, at the control device, selection data that indicates a selection of the selectable region. The functions also involve, irrespective of a prior graphical display and in response to receiving the selection data, identifying, by the control device, browse data that was most-recently accessed by the control device, where the browse data includes an indication of one or more playable media items. Finally, the functions also involve causing, by the control device, the graphical display to provide a visual indication of the one or more playable media items indicated by the identified browse data.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A tangible non-transitory computer readable medium having stored thereon instructions executable by a first control device of a media playback system to cause the first control device to perform a method comprising:

displaying, via a touch-screen display of the first control device, a first control interface for a playback device;
 receiving, via a network interface of the first control device, browse data indicating a particular set of one or more first media items that were accessed by a second control device of the media playback system, wherein accessing the particular set of one or more first media items comprises at least one of: (i) browsing to the particular set of one or more first media items via a second control interface for the playback device on the second control device or (ii) searching for the particular set of one or more first media items via the second control interface for the playback device on the second control device;
 updating browse data to indicate that the particular set of one or more first media items was accessed by the second control device;
 after updating the browse data and before accessing any second media items via the first control interface on the first control device, causing the touch-screen display of the first control device to display one or more first graphical displays of the first control interface for the playback device;
 receiving, via the first control interface displayed by the first control device, selection data that indicates a selection of a particular selectable region within a given first graphical display displayed on the touch-screen display, the given first full-screen graphical display including (i) an indication of a given media item that is (a) being played back on the playback device or (b) queued for playback next in a playback queue and (ii) transport controls selectable to control playback by the playback device;
 in response to the selection of the particular selectable region:
  identifying within the updated browse data, irrespective of (i) the given media item and (ii) the one or more first graphical displays, a set of media items that was most recently accessed by (a) the first control device or (b) the second control device, wherein the browse data indicates that the set of media items that was most recently accessed is the particular set of one or more first media items accessed by the second control device; and
  causing the first control interface to display, on the touch-screen display, a second graphical display that includes a list of the set of media items that was most recently accessed, wherein the set of media items that was most recently-accessed is the particular set of one or more first media items accessed by the second control device;
 receiving, via the first control interface displayed by the first control device, selection data that indicates a selection, within the second graphical display, of at least one first media item from the set of media items that was most recently accessed; and
 in response to the selection of the at least one first media item from the set of media items that was most recently accessed, causing, via the network interface of the first control device, the playback device to initiate playback of the selected at least one first media item from the set of media items that was most recently accessed.

2. The tangible, non-transitory, computer-readable medium of claim 1, wherein the particular set of one or more first media items comprises the given media item that is (a) being played back on the playback device or (b) queued for playback next in the playback queue.

3. The tangible, non-transitory, computer-readable medium of claim 2, wherein the given media item was selected for playback on the second control device.

4. The tangible, non-transitory, computer-readable medium of claim 1, wherein the particular set of one or more first media items excludes the given media item that is (a) being played back on the playback device or (b) queued for playback next in the playback queue.

5. The tangible, non-transitory, computer-readable medium of claim 1, wherein identifying the set of media items that was most recently accessed by (a) the first control device or (b) the second control device comprises:
 identifying, as the set of one or more media items that was most-recently accessed, one of (a) the set of one or more first media items that was most recently accessed by the second control device or (b) a set of one or more second media items was most recently accessed by the first control device.

6. The tangible, non-transitory, computer-readable medium of claim 5, wherein the browse data comprises (i) first browse data indicating the set of one or more first media items that was most recently accessed by the second control device and (ii) second browse data indicating the set of one or more second media items that was most recently accessed by the first control device, and wherein identifying, as the set of one or more media items that was most-recently accessed, one of (a) the set of one or more first media items that was most recently accessed by the second control device or (b) the set of one or more second media items was most recently accessed by the first control device comprises:
 comparing the first browse data to the second browse data; and
 determining, based on the comparison of the first browse data and the second browse data, which of (a) the set of one or more first media items that was most recently accessed by the second control device or (b) the set of one or more second media items that was most recently accessed by the first control device was most recently accessed.

7. The tangible, non-transitory, computer-readable medium of claim 1, wherein the one or more first graphical displays of the first control interface comprise a given first graphical display indicating a queue that includes at least one media item queued for playback at the playback device.

8. A method to be performed by a first control device of a media playback system, the method comprising:

displaying, via a touch-screen display of the first control device, a first control interface for a playback device;

receiving, via a network interface of the first control device, browse data indicating a particular set of one or more first media items that were accessed by a second control device of the media playback system, wherein accessing the particular set of one or more first media items comprises at least one of: (i) browsing to the particular set of one or more first media items via a second control interface for the playback device on the second control device or (ii) searching for the particular set of one or more first media items via the second control interface for the playback device on the second control device;

updating browse data to indicate that the particular set of one or more first media items was accessed by the second control device;

after updating the browse data and before accessing any second media items via the first control interface on the first control device, causing the touch-screen display of the first control device to display one or more first graphical displays of the first control interface for the playback device;

receiving, via the first control interface displayed by the first control device, selection data that indicates a selection of a particular selectable region within a given first graphical display displayed on the touch-screen display, the given first graphical display including (i) an indication of a given media item that is (a) being played back on the playback device or (b) queued for playback next in a playback queue and (ii) transport controls selectable to control playback by the playback device;

in response to the selection of the particular selectable region:
identifying within the updated browse data, irrespective of (i) the given media item and (ii) the one or more first graphical displays, a set of media items that was most recently accessed by (a) the first control device or (b) the second control device, wherein the browse data indicates that the set of media items that was most recently accessed is the particular set of one or more first media items accessed by the second control device; and causing the first control interface to display, on the touch-screen display, a second graphical display that includes a list of the set of media items that was most recently accessed, wherein the set of media items that was most recently-accessed is the particular set of one or more first media items accessed by the second control device;

receiving, via the first control interface displayed by the first control device, selection data that indicates a selection, within the second graphical display, of at least one first media item from the set of media items that was most recently accessed; and in response to the selection of the at least one first media item from the set of media items that was most recently accessed, causing, via the network interface of the first control device, the playback device to initiate playback of the selected at least one first media item from the set of media items that was most recently accessed.

9. The method of claim 8, wherein the particular set of one or more first media items comprises the given media item that is (a) being played back on the playback device or (b) queued for playback next in the playback queue.

10. The method of claim 9, wherein the given media item was selected for playback on the second control device.

11. The method of claim 8, wherein the particular set of one or more first media items excludes the given media item that is (a) being played back on the playback device or (b) queued for playback next in the playback queue.

12. The method of claim 8, wherein identifying the set of media items that was most recently accessed by (a) the first control device or (b) the second control device comprises:
identifying, as the set of one or more media items that was most-recently accessed, one of (a) the set of one or more first media items that was most recently accessed by the second control device or (b) a set of one or more second media items was most recently accessed by the first control device.

13. The method of claim 12, wherein the browse data comprises (i) first browse data indicating the set of one or more first media items that was most recently accessed by the second control device and (ii) second browse data indicating the set of one or more second media items that was most recently accessed by the first control device, and wherein identifying, as the set of one or more media items that was most-recently accessed, one of (a) the set of one or more first media items that was most recently accessed by the second control device or (b) the set of one or more second media items was most recently accessed by the first control device comprises:
comparing the first browse data to the second browse data; and
determining, based on the comparison of the first browse data and the second browse data, which of (a) the set of one or more first media items that was most recently accessed by the second control device or (b) the set of one or more second media items that was most recently accessed by the first control device was most recently accessed.

14. The method of claim 8, wherein the one or more first graphical displays of the first control interface comprise a given display indicating a queue that includes at least one media item queued for playback at the playback device.

15. A first control device of a media playback system, the first control device comprising:
a network interface;
a touch-screen display;
one or more processors; and
data storage having stored therein instructions executable by the one or more processors to cause the first control device to perform a method comprising:
displaying, via the touch-screen display, a first control interface for a playback device;
receiving, via the network interface, browse data indicating a particular set of one or more first media items that were accessed by a second control device of the media playback system, wherein accessing the particular set of one or more first media items comprises at least one of: (i) browsing to the particular set of one or more first media items via a second control interface for the playback device on the second control device or (ii) searching for the particular set of one or more first media items via the second control interface for the playback device on the second control device;
updating browse data to indicate that the particular set of one or more first media items was accessed by the second control device;
after updating the browse data and before accessing any second media items via the first control interface on the first control device, causing the touch-screen display of the first control device to display one or more first graphical displays of the first control interface for the playback device;

receiving, via the first control interface displayed by the first control device, selection data that indicates a selection of a particular selectable region within a given first graphical display displayed on the touch-screen display, the given first graphical display including (i) an indication of a given media item that is (a) being played back on the playback device or (b) queued for playback next in a playback queue and (ii) transport controls selectable to control playback by the playback device;

in response to the selection of the particular selectable region:
  identifying within the updated browse data, irrespective of (i) the given media item and (ii) the one or more first graphical displays, a set of media items that was most recently accessed by (a) the first control device or (b) the second control device, wherein the browse data indicates that the set of media items that was most recently accessed is the particular set of one or more first media items accessed by the second control device; and
  causing the first control interface to display, on the touch-screen display, a second graphical display that includes a list of the set of media items that was most recently accessed, wherein the set of media items that was most recently-accessed is the particular set of one or more first media items accessed by the second control device;

receiving, via the first control interface displayed by the first control device, selection data that indicates a selection, within the second graphical display, of at least one first media item from the set of media items that was most recently accessed; and in response to the selection of the at least one first media item from the set of media items that was most recently accessed, causing, via the network interface of the first control device, the playback device to initiate playback of the selected at least one first media item from the set of media items that was most recently accessed.

16. The first control device of claim 15, wherein the particular set of one or more first media items comprises the given media item that is (a) being played back on the playback device or (b) queued for playback next in the playback queue.

17. The first control device of claim 16, wherein the given media item was selected for playback on the second control device.

18. The first control device of claim 15, wherein the particular set of one or more first media items excludes the given media item that is (a) being played back on the playback device or (b) queued for playback next in the playback queue.

19. The first control device of claim 15, wherein identifying the set of media items that was most recently accessed by (a) the first control device or (b) the second control device comprises:
  identifying, as the set of one or more media items that was most-recently accessed, one of (a) the set of one or more first media items that was most recently accessed by the second control device or (b) a set of one or more second media items was most recently accessed by the first control device.

20. The first control device of claim 19, wherein the browse data comprises (i) first browse data indicating the set of one or more first media items that was most recently accessed by the second control device and (ii) second browse data indicating the set of one or more second media items that was most recently accessed by the first control device, and wherein identifying, as the set of one or more media items that was most-recently accessed, one of (a) the set of one or more first media items that was most recently accessed by the second control device or (b) the set of one or more second media items was most recently accessed by the first control device comprises:
  comparing the first browse data to the second browse data; and
  determining, based on the comparison of the first browse data and the second browse data, which of (a) the set of one or more first media items that was most recently accessed by the second control device or (b) the set of one or more second media items that was most recently accessed by the first control device was most recently accessed.

* * * * *